United States Patent
Hernandez et al.

(10) Patent No.: US 7,801,382 B2
(45) Date of Patent: Sep. 21, 2010

(54) METHOD AND APPARATUS FOR ADJUSTABLE IMAGE COMPRESSION

(75) Inventors: Albert A. Hernandez, Tustin, CA (US); Gregory Cooper, Santa Ana, CA (US); Bernadette M. Baclig, Fullerton, CA (US); Laszlo R. Gasztonyi, Fairfax Station, VA (US)

(73) Assignee: Compressus, Inc., Washington, DC (US)

( * ) Notice: Subject to any disclaimer, the term of this patent is extended or adjusted under 35 U.S.C. 154(b) by 1140 days.

(21) Appl. No.: 11/233,778

(22) Filed: Sep. 22, 2005

(65) Prior Publication Data
US 2007/0065033 A1    Mar. 22, 2007

(51) Int. Cl.
*G06K 9/36* (2006.01)
*G06K 9/46* (2006.01)

(52) U.S. Cl. ...................................... 382/239; 382/128

(58) Field of Classification Search ................. 382/128, 382/131, 132, 239, 240
See application file for complete search history.

(56) References Cited

U.S. PATENT DOCUMENTS

| | | | |
|---|---|---|---|
| 6,937,767 B1* | 8/2005 | Burak et al. | 382/232 |
| 6,968,077 B1* | 11/2005 | Yamanaka | 382/128 |
| 2005/0196023 A1* | 9/2005 | Chen et al. | 382/128 |

OTHER PUBLICATIONS

International Preliminary Report on Patentability; PCT/US2006/036773; dated Mar. 26, 2009; 5pgs.

* cited by examiner

*Primary Examiner*—Phuoc Tran
(74) *Attorney, Agent, or Firm*—The Marbury Law Group PLLC (57) ABSTRACT

A compression rate is selected for a data file representing an image wherein an image source and an image characterization is identified. Selection of a compression rate can be based upon the image source and the image characterization. The image source can be medical imaging device such as x-ray, CT scan, MRI, mammogram, sonogram, or other types of images. The image characterization can be an anatomical content of the image, a purpose of study of the image, or a diagnostic value of the source of the image.

23 Claims, 9 Drawing Sheets

METHOD AND APPARATUS FOR ADJUSTABLE IMAGE COMPRESSION

CROSS REFERENCE TO RELATED APPLICATIONS

This application is related to co-pending U.S. patent application Ser. No. 11/233,777 filed Sep. 22, 2005 entitled "Method and Apparatus for Boundary-Based Image Compression", U.S. patent application Ser. No. 11/233,776 filed Sep. 22, 2005 entitled "Event Notification Verification and Escalation", and U.S. patent application Ser. No. 11/233,775 filed Sep. 22, 2005 entitled "Autonomous Routing of Network Messages", all of which are being filed concurrently with the present application. The disclosures of all of these applications are incorporated by reference.

BACKGROUND OF THE INVENTION

1. Field of the Invention

The present invention relates generally to compression of image data and, more particularly, to adjusting the rate of compression.

2. Description of the Related Art

Transmission and handling of message data is an important function that must be carefully and efficiently performed. For example, a health care delivery system such as a hospital or medical center will receive message data of many different types. It is critical for the health of patients that message data is delivered to appropriate medical staff, with sufficient data integrity to be useful to the staff member. Message data may include image information, for example, image information from a laboratory examination such as an X-ray, computer tomography (CT Scan), magnetic resonance imaging (MRI), or other laboratory examination. The image information can be in a variety of data formats, such as JPEG data, bitmap data, TIFF images, and the like.

Digital representation of image information often requires large amounts of data, making transmission and storage of image data challenging and expensive. Data compression techniques have been developed to reduce the amount of data that must be transmitted and stored. In brief, data compression refers to techniques that represent data files in a format that requires less "bits" than the original data file. The "compression rate" refers to the number of bits in the compressed data file as compared to the number of bits in the uncompressed data file.

Known data compression techniques may be divided into two broad categories, lossy compression and lossless compression. Lossy compression involves compression of a data file that results in the loss of some of the original information when the original data file is reconstructed from the compressed file. In other words, when the original data file is reconstructed from the lossy compressed file, there are differences, or errors, between the reconstructed file and the original file. A typical goal of lossy compression techniques is that the differences, or errors, in the reconstructed data file are tolerable with varying amounts.

Lossless compression involves compression of a data file that results in no loss of original information when the original data file is reconstructed. In other words, lossless compression techniques compress the original data file in such a way that when the original data file is reconstructed from the compressed file there are no differences, or errors, between the reconstructed file and the original file.

Generally, lossy compression techniques can achieve a higher compression ratio, resulting in smaller compressed file sizes, as compared with lossless compression. However, there is usually degradation in the reconstructed data file using lossy compression, while there is no significant degradation in the reconstructed data file using lossless compression.

Use of data compression techniques on medical image files can be beneficial in reducing both the storage capacity and transmission bandwidth required for large image files. For example, digital radiology benefits from compression algorithms by reducing both image storage and transmission costs. However, the amount of compression that can be achieved with medical image files is limited by the amount of "loss" or errors, if any, that are acceptable in the reconstructed image, i.e., there may be resolution or loss specifications set by the medical application for the data. To illustrate, because radiology imagery may be critical for the health of patients, it is important to maintain the image "quality" which means that generally less error and therefore less compression can be tolerated. This limits the storage and transmission benefits achievable with higher amounts of compression.

From the discussion above, it should be apparent that there is a need for a system and techniques that can improve data compression of image data files for reduced consumption of system resources while maintaining sufficient data fidelity. Other problems with the prior art not described above can also be overcome using the teachings of the present invention, as would be readily apparent to one of ordinary skill in the art after reading this disclosure.

SUMMARY

In accordance with embodiments of the invention, techniques are described for adjusting the compression rate used for compressing a data file representing an image. The images can be medical imagery such as x-ray, CT scan, MRI, mammogram, sonogram, or other types of images.

For such images, an image source and an image characterization are identified, and a compression rate is selected based upon the image source and the image characterization. The image source can refer to the device type that created the image data file or to the data format of the image data file. The image characterization can be a wide variety of parameters related to the depicted image. For example, the image characterization can comprise data that indicates an anatomical content of the image that can be identified by a user or that can be automatically identified. The image characterization can also comprise a purpose of study of the image. In addition, the image characterization can comprise a metric such as a diagnostic value of the source of the image that can be identified by a user or automatically identified.

The techniques can also comprise compressing the data file using the selected compression rate. The techniques can be implemented on a computer processing apparatus adapted for processing the data file representing an image. The computer processing apparatus may comprise a network communications interface that permits communications between the apparatus and a network. The computer processing apparatus may further comprise a processor that receives the data file representing an image and identifies an image source and an image characterization associated with the file. The computer processing apparatus preferably selects a compression rate based upon the image source of the image characterization.

Other features and advantages of the present invention should be apparent from the following description of the exemplary embodiments, which illustrate, by way of example, principles of the present invention.

DETAILED DESCRIPTION

The present invention can be used for processing image files related to medical diagnosis and the life sciences, where image fidelity is important. Imagery is a valuable tool in medical diagnosis and treatment. For example, radiology is a medical field that has made extensive use of film images for years. More recently digital technology has been applied to radiology imagery including digital captured images and digital conversions of film images. Digital radiology allows for the storage and transmission of digital data file representations of radiology images. While digital data files have features that are superior to film imagery, in particular when storing or transmitting images, a drawback is that high fidelity digital representation of radiology images results in data files that are large, requiring large amounts of data storage and communication channels with high bandwidth for transmission.

Conventional data compression techniques have been applied to radiology image files with limited success. While conventional data compression techniques may result in smaller data file size, they can also result in unacceptable loss of fidelity in the reconstructed image. This loss in fidelity can result in the reconstructed image being of limited, or no, use to a radiologist. Techniques are described herein that adjust the compression rates used to compress image files based upon the image source and a characterization of the image while maintaining adequate fidelity of the reconstructed image to ensure the compressed images are useful.

Figure 1:
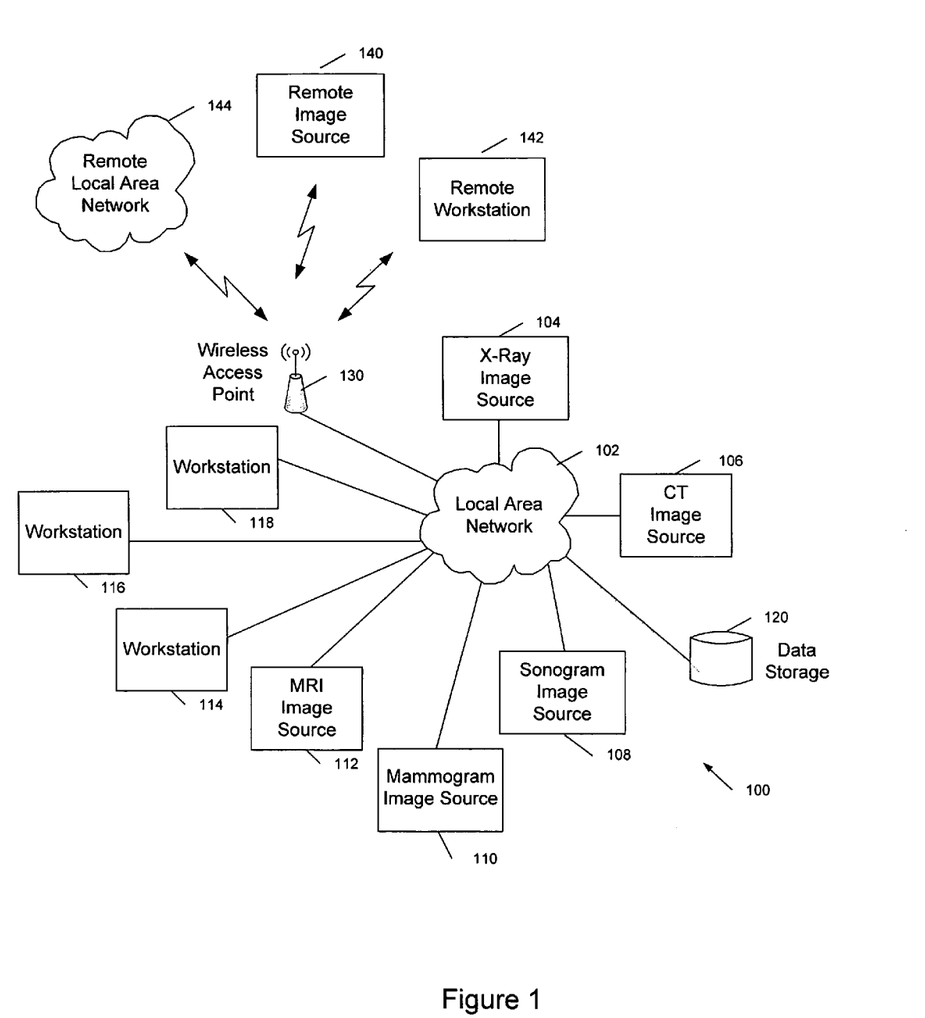
FIG. 1 is a block diagram representation of a local area network in which digital images can be shared and stored.

FIG. 1 is a block diagram representation of a local area network with image source devices and processing stations in which digital images can be shared and stored in accordance with the invention. As shown in FIG. 1, a local area network 102 can be accessed by multiple users of devices. For example, in a health care facility the local area network 102 may be accessed by multiple image sources that acquire imagery, such as an x-ray image source 104, CT image source 106, sonogram image source 108, mammogram image source 110, and an MRI image source 112. Imagery acquired by the sources may be shared with user workstations 114, 116, and 118 or stored in data storage 120 via the local area network 102. An image source may share or store the raw, or non-processed, image data or it may do some processing of the image such as compress the image as described below. The workstations may view imagery acquired by an image source directly from the image source or an image that has been stored in data storage 120 or local storage included in the image source or the workstation. The workstations may also process imagery and save the processed imagery. In addition, an image source can also be used as a workstation.

A wireless access point 130 may also interface to the local area network 102. The wireless access point 130 can allow a remote image source 140 access to the local area network 102. The wireless access point 130 can also allow a remote workstation 142, or a remote local area network 144 access to the local area network 102. For example, a remote image source 140, such as an x-ray machine, may produce an x-ray image of a patient in an ambulance and transmit it to the local area network 102 of a health facility where the patient is being taken. Prior to the transmission the imagery of the x-ray may be compressed as described below. At the health facility a health care provider may access the x-ray on a workstation to prepare treatment in advance of the patient's arrival. Likewise, imagery may be transmitted to a remote local area network 144 or remote workstation 142. For example, imagery may be transmitted to an expert at a remote local so that the expert can assist in diagnosis and treatment of a patient. In all of these examples, the image remote location data may be compressed in accordance with one or more of adjustable compression rates described below.

Figure 2:
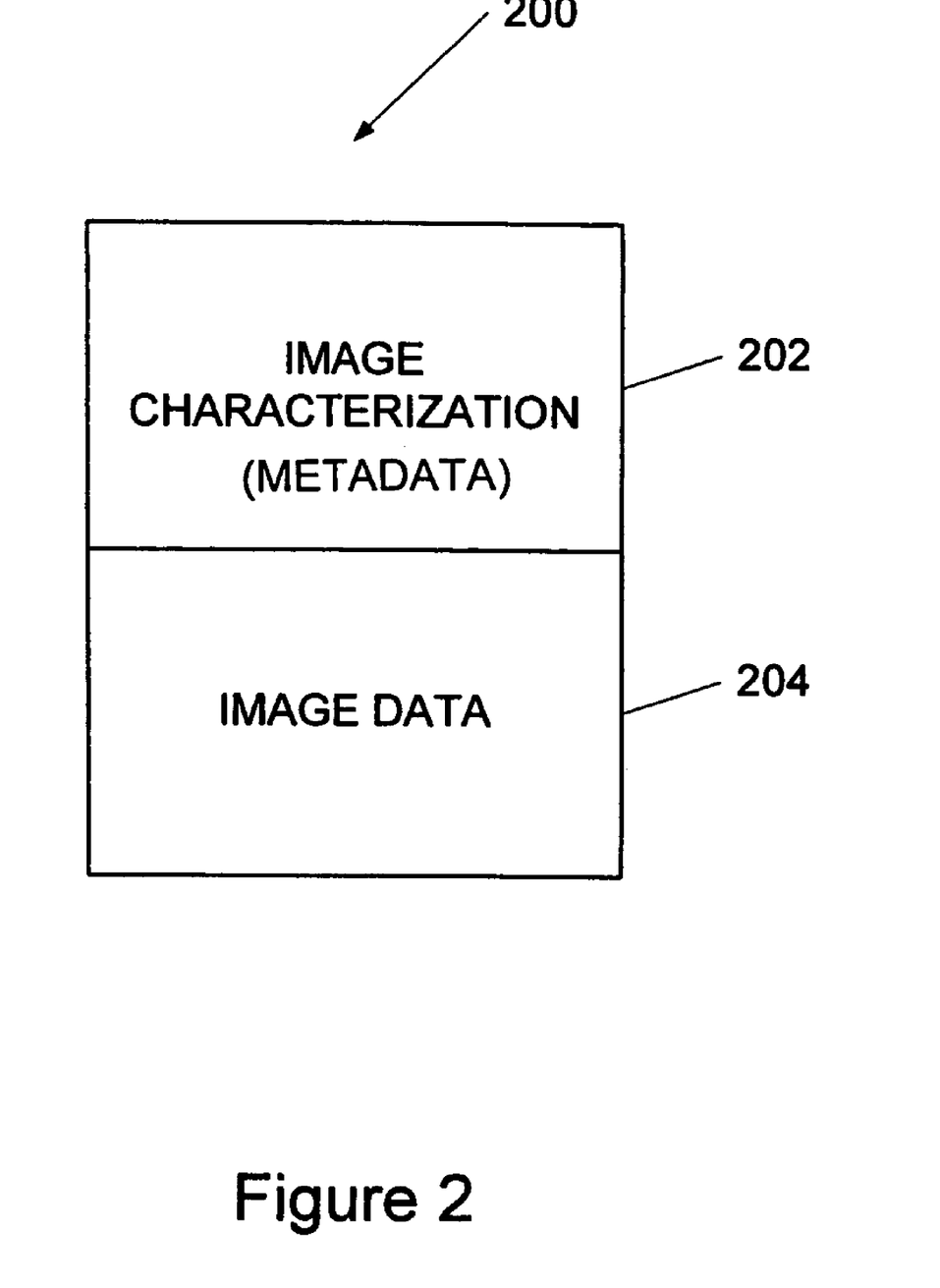
FIG. 2 is a block diagram illustrating an example of a structure of an image data file.

FIG. 2 is a block diagram illustrating an example of a structure of an image data file 200. The image data file 200 includes at least two different types of data, image characterization data 202 and image data 204. The image data 204 is the data used to present the image and may be raw image data, original image data, or compressed image data. The image characterization data 202 includes fields or tags that identify various characteristics of the image. For example, the image characterization data 202 can include fields or tags identifying an image source device, an anatomical content of the image, a diagnostic value of the image, a purpose of study of the image, or other characteristic of the image. The image data file 200 may be stored in the data storage 120 of the system or it may also be stored in data storage of the source devices or remote stations, etc.

Figure 3:
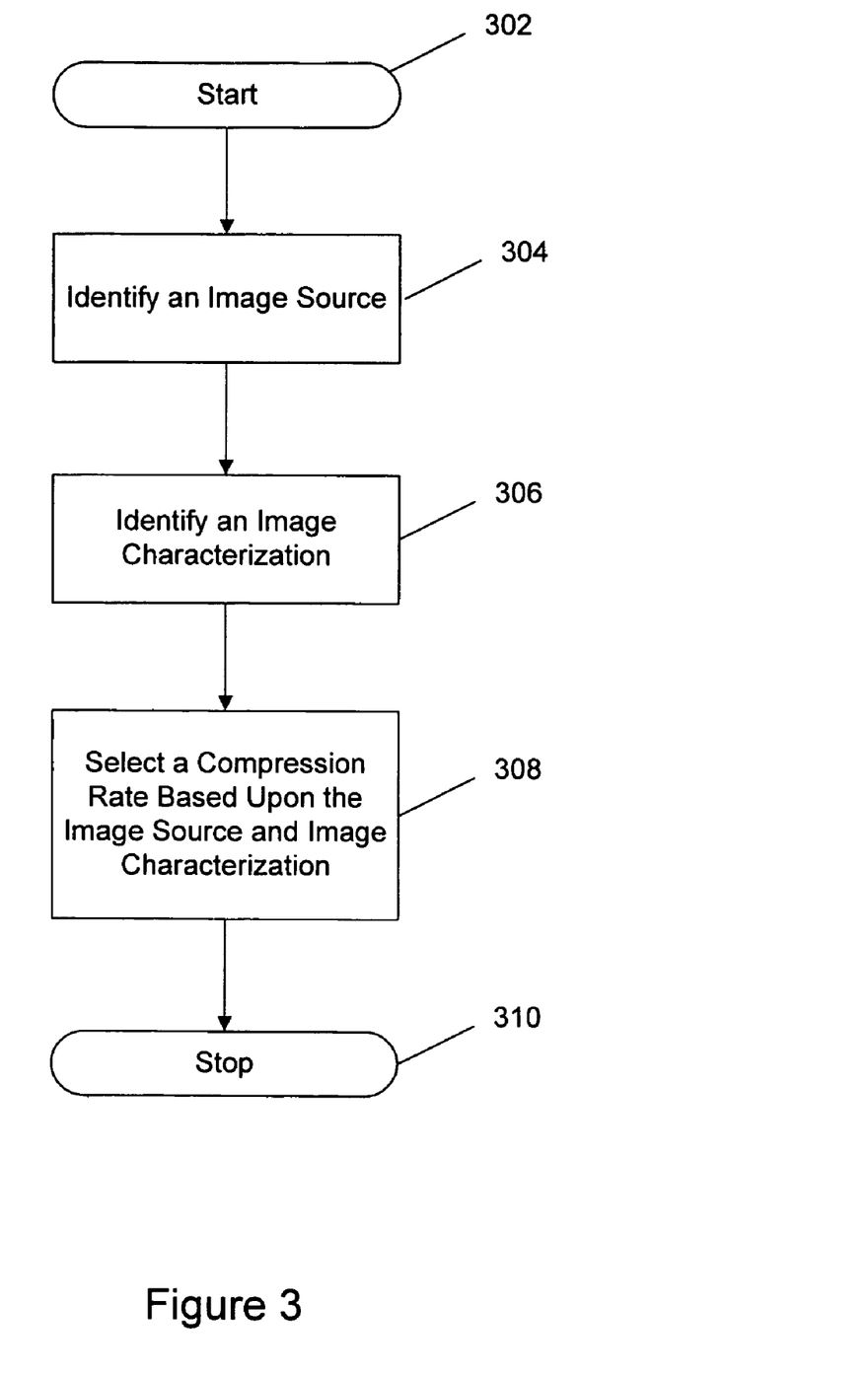
FIG. 3 is a flow chart illustrating an example of determining a compression rate.

FIG. 3 is a flowchart illustrating an example of determining a compression rate with the system of FIG. 1. Flow begins in block 302. Flow continues to block 304 where the source of an image, or the type of device producing the image, is identified. For example, as previously described different sources of images can include X-ray machines, CT scanners, mammogram machines, MRI machines, sonogram machines, optical scanners, as well as other types of diagnostic devices that produce digital images. Flow continues to block 306 where an image characterization for the image is identified. For example, image characterizations can include the anatomical content of the image, or the purpose of study for which the image will be used, or the quality or diagnostic value of the image.

Flow then continues to block 308 where a compression rate is determined based upon the image source and image characterization. In other words, the system identifies the source of the image, and also identifies one or more characterizations about the image. The image characterization data may be a data field associated with the digital data file and which identifies a characteristic of the image and of the data file. Then, applying rules for that type of image source and the image characterization, a compression rate or value is determined. Flow then continues to block 310.

Image characterization data for an image may be entered by a user or determined automatically. For example, the anatomical content of an image may be identified and entered by a user such as a radiologist examining an x-ray. Or, the anatomical content of an image may be determined automatically, such as by a software routine that processes the image data and identifies regions within the image and associates these regions with anatomical structures.

Also, the image characterization data may be determined at the time of compression or it may be included within the data file representing the image. For example, the anatomical content may be determined, either manually or automatically, when the data file is compressed. Or, the anatomical content of the image may have been previously determined before compression and may be included within the image data file, such as a data field or tag within the file identifying what anatomical structure is depicted within the image. For example, an x-ray technician may identify that an x-ray image is of a particular anatomical structure, such as a chest or a femur, and this information may be included as a data field or tag within the data file representing the image.

Figure 4:
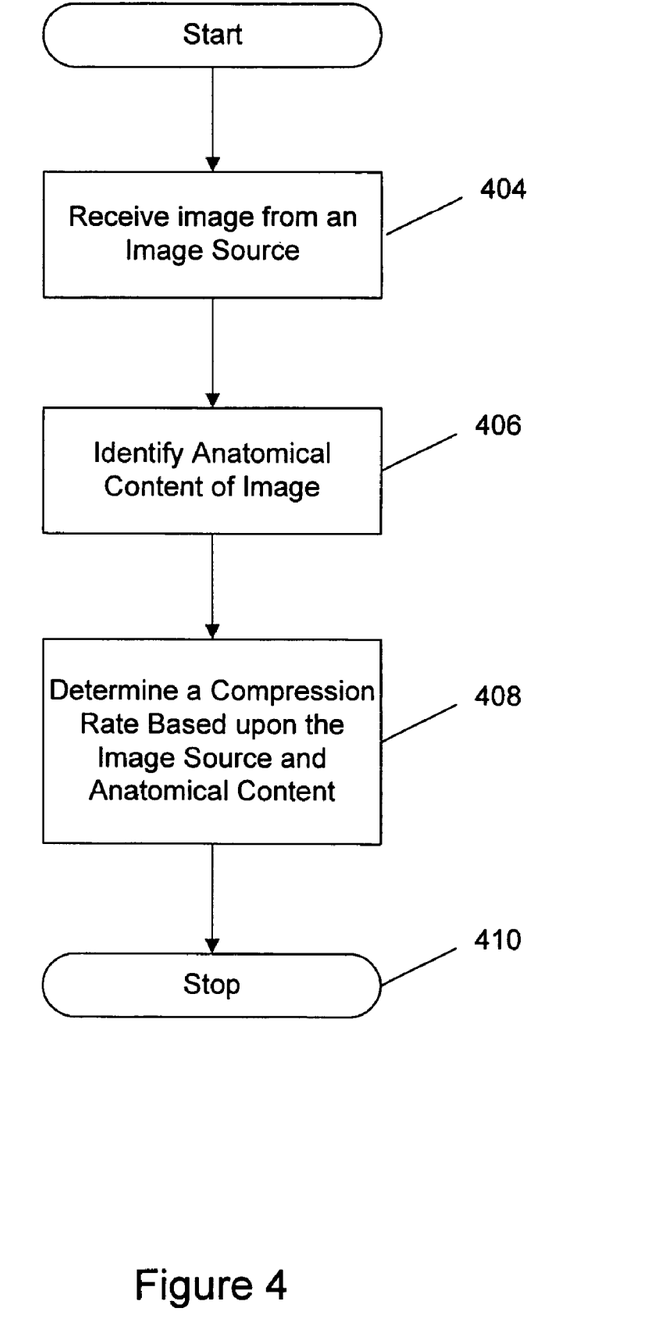
FIG. 4 is a flow chart illustrating an example of determining a compression rate based upon anatomical content of the image.

FIG. 4 is a flowchart illustrating an example of determining a compression rate from an image characterization that is based, in part, upon anatomical content of an image. Flow begins in block 402. Flow continues to block 404 where the image source, or device producing the image, is identified. Flow continues to block 406 where the anatomical content of the image is identified. For example, the anatomical content could be a knee, a chest, a lung, a pancreas or a liver. As noted, the anatomical content may be identified manually or automatically.

Flow continues to block 408 where compression rate is determined based upon the image source and the anatomical content of the image. In other words, a system identifies the source or device producing the image, and also identifies the gross anatomy of the image. Then, applying rules for that type of image source and that type of anatomy, a compression value is determined.

For example, an x-ray image may normally be compressed at a nominal rate of 8:1 set by medically acceptable standards, where the size of the data file representing the image is reduced by a factor of 8 after compression, but that rate may be adjusted depending on the characterization of the image. If the image characterization of the x-ray image identifies that the image includes a particular anatomical content, then the system may adjust the rate. For example, if a chest x-ray is being compressed, it may be acceptable to adjust the nominal compression rate of 8:1 down to a rate of 4:1, while maintaining sufficient fidelity of the reconstructed image. Likewise, if the x-ray is of a femur, it may be acceptable to adjust the nominal compression rate up to a rate of 10:1 because adequate fidelity may be maintained at this higher compression rate for an x-ray of a femur. After compression rate is determined, flow continues to block 410.

Figure 5:
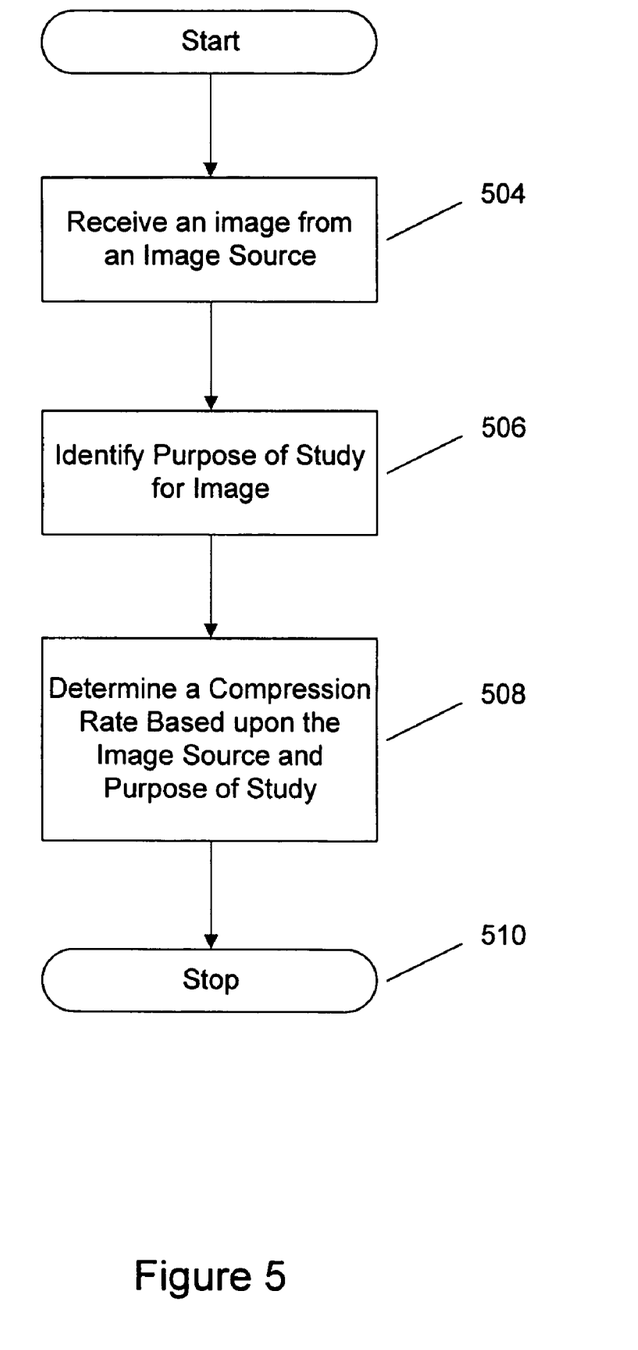
FIG. 5 is a flow chart illustrating another example of determining a compression rate based upon a purpose of study of the image.

FIG. 5 is a flowchart illustrating an example of determining a compression rate from an image characterization that is based, in part, upon a purpose of study of the image. Flow begins in block 502. Flow continues to block 504 where the image source is identified. Flow then continues to block 506. In block 506, the purpose of study that the image will be used for is identified. Examples of different study purposes include using the image for a search for cancer, a bone fracture or a tissue rupture.

Flow then continues to block 508 where a compression rate based upon the image source and purpose of study is determined. For example, a typical x-ray image may be compressed at a nominal ratio of 8:1, but depending on the purpose of study, that rate may be adjusted. If an x-ray is being used to identify a hairline fracture, then it may be desired to reduce the nominal compression rate of 8:1 to a lower rate, such as 4:1, so as to maintain adequate fidelity in an image reconstructed from the compressed data file, to identify the hairline fracture. On the other hand, if the purpose of study is to identify a complete fracture, then it may be acceptable to increase the nominal compression rate of 8:1 to a higher rate, such as 10:1, because adequate fidelity may be maintained in the reconstructed image to identify a complete fracture at this higher rate of compression. Flow then continues to block 510 for further system processing.

Figure 6:
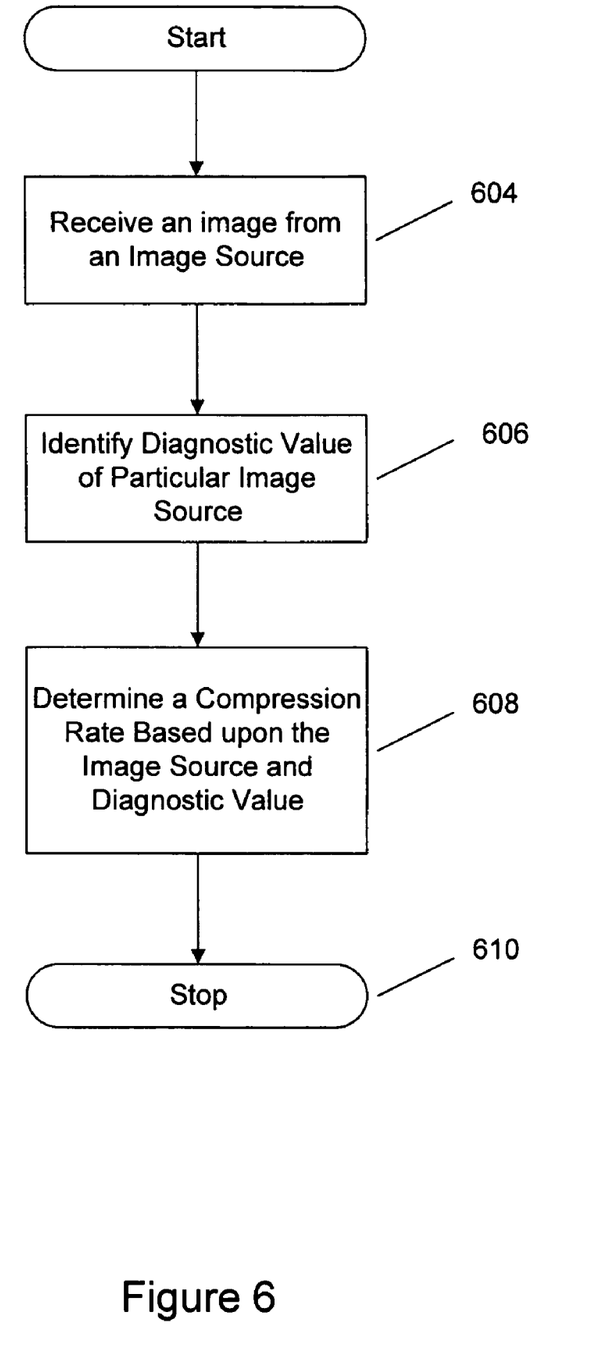
FIG. 6 is a flow chart illustrating yet another example of determining a compression rate based upon a diagnostic value of a particular source.

FIG. 6 is a flowchart illustrating an example of determining a compression rate based, in part, upon a diagnostic value of a particular produced image. Flow begins in block 602. Flow continues to block 604 where the type of image source is identified. Flow then continues to block 606 where a diagnostic value, or quality, of the particular image produced by the source is identified. For example, the diagnostic value of a first x-ray image may be different than diagnostic value of a second x-ray image. In other words, for two x-ray images of the same object or subject, a first image may be at a higher resolution, may have less noise, or may have other characteristics indicating it was produced at a better quality than the second image. Differences in image quality are common, as patients may move during imaging or operational settings of the imaging source may be changed from image to image. Thus, the diagnostic value of the first image can be said to be greater than the diagnostic value of the second image. Flow then continues to block 608 where a compression rate based upon the type of image source and a diagnostic value of the particular image produced is determined. For example, if a particular image source has a low diagnostic value, it may be desirable to increase the compression rate used to compress images from the particular source above a nominal compression rate for a typical image source of the same type. Likewise, if the diagnostic value is high, it may be desired to decrease the compression rate below the nominal rate. Adjusting the compression rate based upon the diagnostic value of images from a particular source may be used to maintain adequate fidelity in an image reconstructed from the compressed data file. Flow then continues to block 610.

The diagnostic value of output produced from different image sources can vary for many reasons. For example, two x-ray devices that are the same models may nevertheless produce different quality images because of various reasons such as maintenance issues or installation differences or operator skill. Likewise, the same image source's diagnostic value can change over time. That is, an x-ray device may produce images of a certain quality when first manufactured, but the image quality may deteriorate over time as the device is ages.

The diagnostic value of an image source may be determined in different ways. For example, a calibration procedure or test may be performed on the image source and a figure of merit corresponding to the quality, or diagnostic value of images produced by the source, identified. Likewise, an analysis of an image may be performed automatically to identify the diagnostic value of the image.

Figure 7:
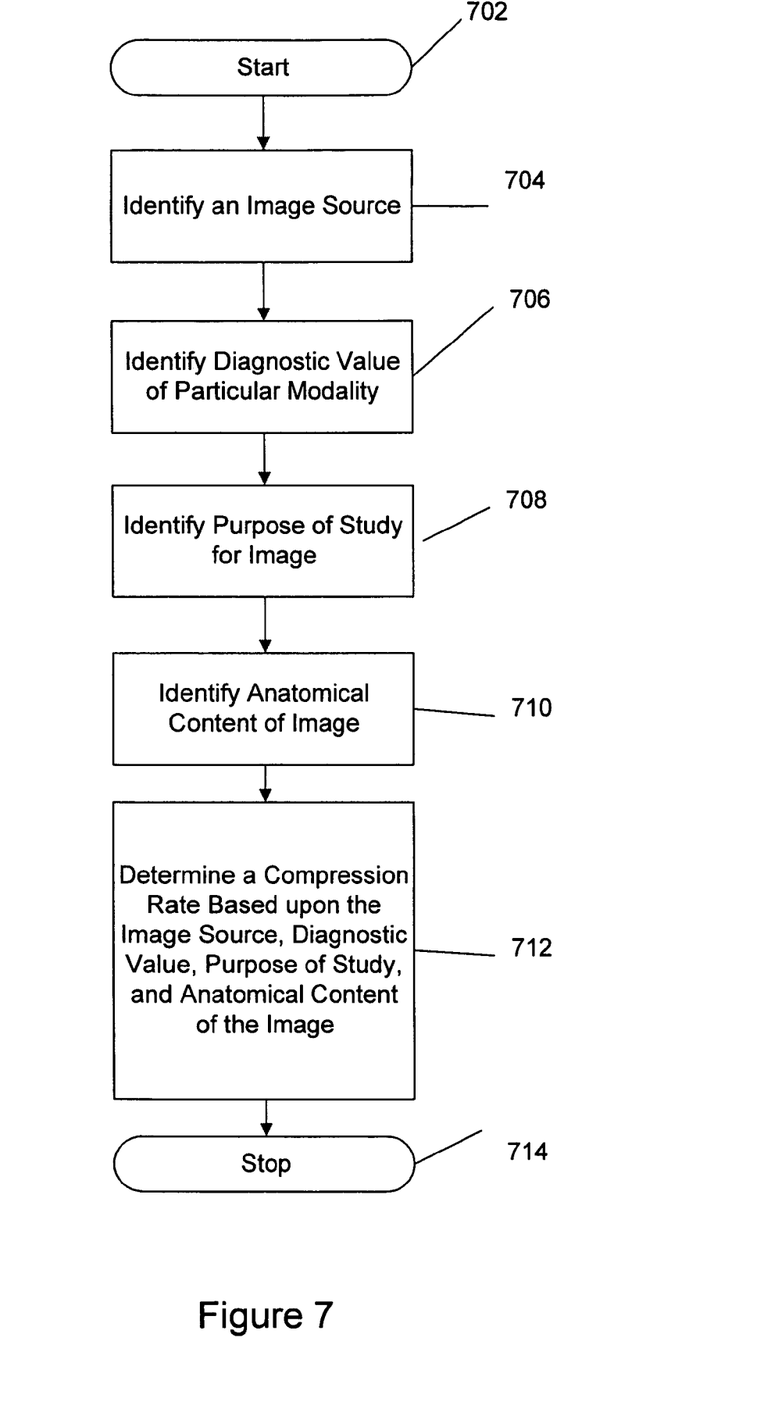
FIG. 7 is a flow chart illustrating another example of determining a compression rate.

FIG. 7 is a flowchart illustrating another example of determining a compression rate. Flow begins in block 702. Flow continues to block 704 where the image source is identified. Then, in block 706, a diagnostic value of the particular image source is identified. Flow continues to block 708 where the purpose of study for the image, is identified. Flow continues to block 710 where the anatomical content of the image is identified. Flow then continues to block 712 where a compression rate based on image source, diagnostic value, purpose of study and anatomical content is determined.

In other embodiments one or more of the type of image source or image characteristics may be used to determine a compression rate. For example, one or more of the image sources, diagnostic value, purpose of study or anatomical content can be used in determining a compression rate.

The techniques described can be used with various types of data compression algorithms. For example, the techniques can be used with compression algorithms such as Huffman coding, arithmetic coding, JPEG coding, and JPEG-2000 coding.

Figure 8:
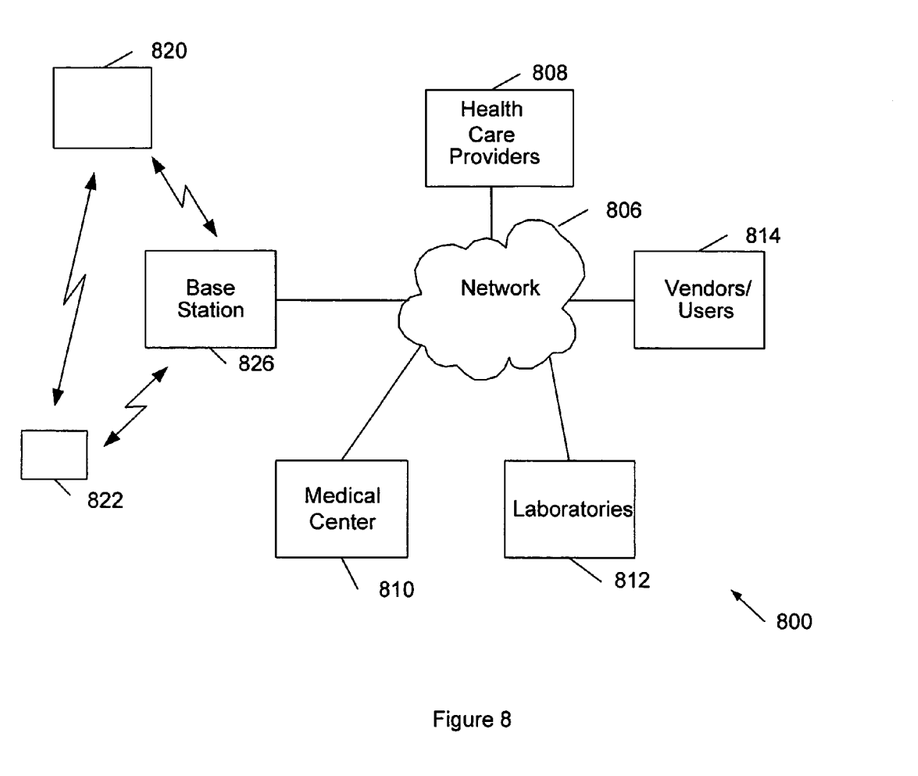
FIG. 8 is a block diagram representation of a data network environment in which digital images can be sent and received over a computer network.

FIG. 8 is a block diagram representation of a data network environment 800 in which digital images can be sent and received over a computer network 806. Communications over the network can occur, for example, according to transport mechanisms such as TCP/IP, or can be received according to network-specific protocols. In the FIG. 8 illustrated embodiment, the image sources can include health care providers 808 such as individual physicians and other allied providers, medical centers 810 such as hospitals and patient care or managed care facilities, laboratories 812 such as medical labs and diagnostic centers, and vendors and users 814, including individual patients, administration services such as management and insurance providers, and other network users who need to communicate images with one of the other network users 808, 810, 812, 814. The network 806 can comprise a local area network (LAN) that interconnects the network nodes 808, 810, 812, 814. The network 806 can include communications over the Internet, or over a combination of local and wide area networks, including intranets and extranets.

As illustrated in FIG. 8, there can also be one or more mobile units 820, 822 that are in wireless communication with a base station 826 that is in communication with the network 806. The mobile units 820, 822 may also communicate directly with each other. The base station 826 can comprise a network access point or an operational work station such as 808-814. In one example, the mobile units 820, 822 could be emergency units, or other first responders, that can be dispatched to an accident or emergency situation. The remote units 820, 822 may include diagnostic equipment, such as x-ray equipment. Upon arriving at an accident or emergency scene, the remote unit 820, 822 may gather diagnostic imagery, compress it using the techniques described and send it over the wireless communication channel to the base station 826 where others connected to the network 806 have access to the image. Because the wireless communication channel will generally have limited bandwidth, this may be taken into consideration when compressing the imagery. Users 808, 810, 812, 814 on the network may also transmit imagery to each other and to the remote unit 820, 822 using the compression techniques described. In addition, remote units may communicate imagery between each other using the compression techniques described. The embodiment of FIG. 8 may also be used in other environments, for example, battlefield environments where remote units 820, 822 may include doctors and field hospitals setup to assist troops during combat or in other hostile environments.

Figure 9:
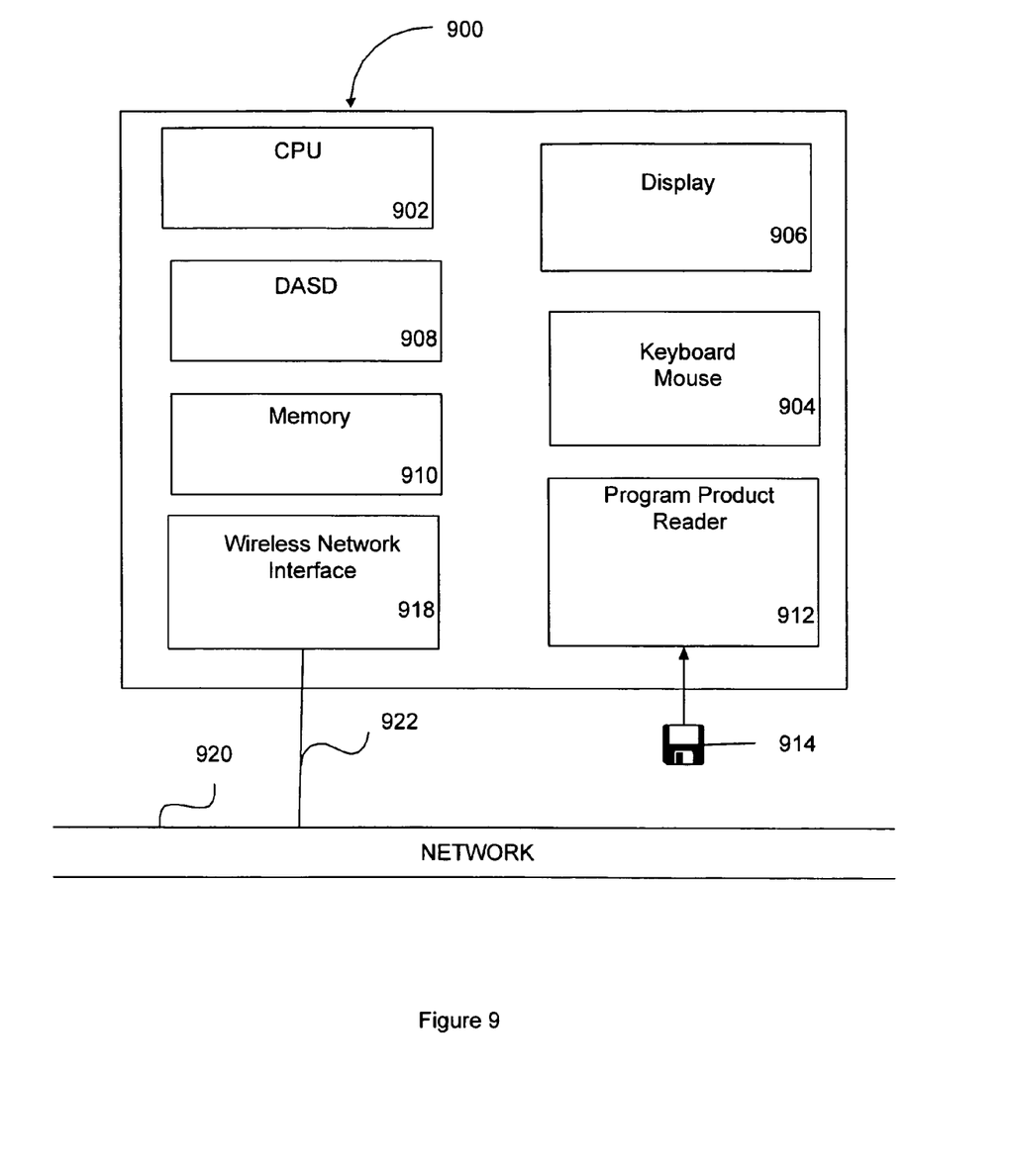
FIG. 9 is a block diagram of an exemplary computer for executing image compression.

FIG. 9 shows an exemplary computer 900 for executing the operations described above. The computer 900 operates in a networked environment that permits communication with other computers. The computer 900 operates under control of a central processor unit (CPU) 902, such as a "Pentium" microprocessor and associated integrated circuit chips, available from Intel Corporation of Santa Clara, Calif., USA. A computer user can input commands and data from a keyboard and computer mouse 904, and can view inputs and computer output at a display 906. The display 906 is typically a video monitor or flat panel display. The computer 900 also typically includes a direct access storage device (DASD) 908, such as a hard disk drive. A memory 910 typically comprises volatile semiconductor random access memory (RAM). Each computer 900 preferably includes a program product reader 912 that accepts a program product storage device 914, from which the program product reader 912 can read data (and to which it can optionally write data). The program product reader can comprise, for example, a disk drive, and the program product storage device 914 can comprise removable storage media such as a magnetic floppy disk, a CD-R disc, a CD-RW disc, or DVD disc.

The computer 900 can communicate with any other computers, if networked, over a computer network 920 (such as the Internet or an intranet. or a wireless communication channel) through a network interface 918 that enables communication over a connection 922 between the network 920 and the computer. The network interface 918 typically comprises, for example, a Network Interface Card (NIC) or a modem that permits communications over a variety of networks. or a wireless modem.

The CPU 902 operates under control of programming instructions that are temporarily stored in the memory 910 of the computer 900. When the programming instructions are executed, the computer 900 performs its functions. Thus, the programming implements the functionality of the system described above. The programming steps can be received from the DASD 908, through the program product storage device 914, or through the network connection 922. The program product storage drive 912 can receive a program product 914, read programming instructions recorded thereon, and transfer the programming steps into the memory 910 for execution by the CPU 902. As noted above, the program product storage device 914 can comprise any one of multiple removable media having recorded computer-readable instructions, including magnetic floppy disks and CD-ROM storage discs. Other suitable program product storage devices 914 can include magnetic tape and semiconductor memory chips. In this way, the processing steps necessary for operation in accordance with the invention can be embodied on a program product.

Alternatively, the program steps can be received into the operating memory 910 over the network 920. In the network method, the computer 900 receives data including program steps into the memory 910 through the network interface 918 after network communication has been established over the network connection 922 by well-known methods that will be understood by those skilled in the art without further explanation. The program steps are then executed by the CPU 902 thereby comprising a computer process.

Thus, embodiments of the present invention provide techniques for compressing data files. The compressed data files can be stored as well as routed over data networks, or message systems. The techniques, applicable in a variety of message systems, improve the efficiency and appropriateness of message handling.

The present invention has been described above in terms of presently preferred embodiments so that an understanding of the present invention can be conveyed. There are, however, many configurations for network message processing not specifically described herein but with which the present invention is applicable. The present invention should therefore not be seen as limited to the particular embodiments described herein, but rather, it should be understood that the present invention has wide applicability with respect to network message processing generally. All modifications, variations, or equivalent arrangements and implementations that are within the scope of the attached claims should therefore be considered within the scope of the invention.

We claim:

1. A method of processing a data file representing an image, the method comprising:
   identifying an image source device associated with the image from a plurality of known image source devices;
   identifying image characterization data associated with content of the image;
   selecting a compression rate based upon applying rules to the identified image source device and image characterization data for maintaining adequate fidelity of a reconstructed image to ensure compressed data files of images are useful, wherein the compression rate is adjustably selected from one of a nominal compression rate for the identified image source device, a compression rate greater than the nominal compression rate and a compression rate less than the nominal compression rate; and
   compressing the data file at the selected compression rate.

2. A method as defined in claim 1, wherein identifying image characterization data comprises identifying anatomical content of the image.

3. A method as defined in claim 2, wherein identifying the anatomical content of the image comprises putting image characterization data in an image data file.

4. A method as defined in claim 2, wherein identifying the anatomical content of the image comprises automatically identifying anatomical content with a computer.

5. A method as defined in claim 1, wherein image characterization data identifies a purpose of study of the image.

6. A method as defined in claim 1, wherein image characterization data identifies a diagnostic value of the image.

7. A method as defined in claim 6, wherein identifying the diagnostic value of the image comprises putting image characterization data on a computer interface.

8. A method as defined in claim 6, wherein identifying the diagnostic value of the image data comprises automatically identifying diagnostic value with a computer.

9. A method as defined in claim 1, wherein the image source device is one of an MRI device, an x-ray device, a CT Scan device, a mammogram device, or a sonogram device.

10. A computer processing apparatus for processing a data file representing an image, the apparatus comprising:
    a network communications interface that permits communications between the apparatus and a network;
    a processor that receives the data file via the interface and identifies an image source device from a plurality of known image source devices and image characterization data associated with the content of the image in the data file, selects a compression rate based upon applying rules to the identified image source device and image characterization data for maintaining adequate fidelity of a reconstructed image to ensure compressed images are useful, wherein the compression rate is adjustably selected from one of a nominal compression rate for the identified image source device, a compression rate greater than the nominal compression rate and a compression rate less than the nominal compression rate; and compresses the data file using the selected compression rate to produce a compressed data file that is smaller in size.

11. The computer processing apparatus defined in claim 10, wherein the identified image characterization data identifies an anatomical content of the image.

12. The computer processing apparatus defined in claim 11, wherein identifying the anatomical content of the image comprises putting image characterization data in an image data file.

13. The computer processing apparatus defined in claim 11, wherein identifying the anatomical content of the image comprises automatically identifying anatomical content with a computer.

14. The computer processing apparatus defined in claim 10, wherein image characterization data identifies a purpose of study of the image.

15. The computer processing apparatus defined in claim 10, wherein image characterization data identifies a diagnostic value of the image.

16. The computer processing apparatus defined in claim 15, wherein identifying the diagnostic value of the image comprises putting image characterization metadata on a computer in an image data file.

17. The computer processing apparatus defined in claim 15, wherein identifying the diagnostic value of the image data comprises automatically identifying diagnostic value with a computer.

18. The computer processing apparatus defined in claim 10, wherein the image source device is one of an MRI device, an x-ray device, a CT Scan device, a mammogram device, and a sonogram device.

19. A program product comprising program code recorded on a non-transitory computer-readable medium for causing a computer to perform operations of:
    identifying an image source device associated with a data file representing the image from a plurality of known image source devices;
    identifying image characterization data associated with content of the image;
    selecting a compression rate for the data file based upon applying rules to the identified image source device and image characterization data for maintaining adequate fidelity of a reconstructed image to ensure compressed images are useful, wherein the compression rate is adjustably selected from one of a nominal compression rate for the identified image source device, a compression rate greater than the nominal compression rate and a compression rate less than the nominal compression rate; and
    compressing the data file at the selected compression rate to produce a compressed data file that is smaller in size.

20. A program product as defined in claim 19, wherein identifying image characterization data identifies an anatomical content of the image.

21. A program product as defined in claim 19, wherein image characterization data identifies a purpose of study of the image.

22. A program product as defined in claim 19 wherein image characterization data identifies a diagnostic value of the source of the image.

23. A program product as defined in claim 19, wherein the image source device is one of an MRI device, an x-ray device, a CT Scan device, a mammogram device, and a sonogram device.

* * * * *